(12) United States Patent
Niyogi et al.

(10) Patent No.: US 10,949,485 B2
(45) Date of Patent: Mar. 16, 2021

(54) GENERATING AND PRESENTING TARGETED ADVERTISEMENTS INCLUDING REPRESENTATIONS OF SUBJECT INDIVIDUALS

(75) Inventors: Sourabh Niyogi, Burlingame, CA (US); David Robert Gentzel, Mill Valley, CA (US)

(73) Assignee: LivingSocial, Inc., Washington, DC (US)

( * ) Notice: Subject to any disclaimer, the term of this patent is extended or adjusted under 35 U.S.C. 154(b) by 471 days.

(21) Appl. No.: 12/393,795

(22) Filed: Feb. 26, 2009

(65) Prior Publication Data
US 2009/0228335 A1 Sep. 10, 2009

Related U.S. Application Data

(60) Provisional application No. 61/031,692, filed on Feb. 26, 2008.

(51) Int. Cl.
*G06Q 30/02* (2012.01)
*G06F 16/955* (2019.01)
(Continued)

(52) U.S. Cl.
CPC ...... *G06F 16/955* (2019.01); *G06F 16/24578* (2019.01); *G06Q 10/00* (2013.01);
(Continued)

(58) Field of Classification Search
CPC ..................................................... G06Q 30/00
See application file for complete search history.

(56) References Cited

U.S. PATENT DOCUMENTS 6,430,539 B1 8/2002 Lazarus et al.
7,433,832 B1 * 10/2008 Bezos et al. ................ 705/26.8
(Continued)

FOREIGN PATENT DOCUMENTS

JP 2005107292 4/2005

OTHER PUBLICATIONS

Yan, J. et al., 'How Much Can Behavioral Targeting Help Online Advertising?' International World Wide Conference Web Committee (IW3C2), 222 2009, Madrid, Spain, Apr. 20-24, 2009, pp. 261-270, ACM.
(Continued)

*Primary Examiner* — Eric R Netzloff
(74) *Attorney, Agent, or Firm* — Alston & Bird LLP

(57) ABSTRACT

Advertisements are generated and selected for display to users, wherein the advertisements include representations of subject individuals. These subject individuals can be friends with whom the user interacts on the Internet and/or any other contributors who may or may not have expertise with regard to the subject matter of the advertisement. A subject individual can be portrayed in an advertisement by including any type of representation of the individual.
Ranks for the subject individuals are determined based on the subject individuals' interactions with advertisements and/or on other factors. An advertisement is selected and presented to a user based on a score derived from friends' and/or contributors' interactions with the advertisement. According to various embodiments of the invention, a method is provided for choosing which advertisement(s) to show to a user and which subject individuals to portray in the advertisements.

26 Claims, 8 Drawing Sheets

(51) Int. Cl.
*G06F 16/2457* (2019.01)
*G06Q 10/00* (2012.01)
*G06Q 30/00* (2012.01)

(52) U.S. Cl.
CPC ......... *G06Q 30/00* (2013.01); *G06Q 30/0255* (2013.01); *G06Q 30/0269* (2013.01)

(56) References Cited

U.S. PATENT DOCUMENTS

| | | | |
|---|---|---|---|
| 7,970,657 B2* | 6/2011 | Morgenstern | 705/26.1 |
| 8,171,128 B2 | 5/2012 | Zuckerberg et al. | |
| 8,499,247 B2 | 7/2013 | Niyogi et al. | |
| 8,666,812 B1 | 3/2014 | Gandhi | |
| 8,898,579 B2 | 11/2014 | Niyogi et al. | |
| 10,510,043 B2* | 12/2019 | Gerace | G06Q 30/0269 |
| 2002/0123928 A1 | 9/2002 | Eldering et al. | |
| 2003/0177063 A1* | 9/2003 | Currans et al. | 705/14 |
| 2005/0114526 A1 | 5/2005 | Aoyama | |
| 2005/0137958 A1 | 6/2005 | Huber et al. | |
| 2006/0042483 A1* | 3/2006 | Work | G06F 16/24578 101/91 |
| 2006/0193008 A1* | 8/2006 | Osaka | G06F 17/211 358/1.18 |
| 2006/0212305 A1 | 9/2006 | Bogle et al. | |
| 2006/0271425 A1 | 12/2006 | Grossnickle et al. | |
| 2007/0121843 A1* | 5/2007 | Atazky | H04M 15/00 379/114.13 |
| 2008/0033776 A1* | 2/2008 | Marchese | 705/8 |
| 2008/0097843 A1 | 4/2008 | Menon et al. | |
| 2008/0109491 A1 | 5/2008 | Gupta | |
| 2008/0140674 A1 | 6/2008 | Ishikawa | |
| 2008/0147482 A1* | 6/2008 | Messing et al. | 705/10 |
| 2008/0183558 A1 | 7/2008 | Koran | |
| 2008/0189122 A1* | 8/2008 | Coletrane | G06Q 50/01 705/319 |
| 2008/0189169 A1 | 8/2008 | Turpin et al. | |
| 2008/0209322 A1* | 8/2008 | Kaufman | 715/716 |
| 2009/0006375 A1* | 1/2009 | Lax | G06Q 30/02 |
| 2009/0019053 A1* | 1/2009 | Burgess | G06Q 30/06 |
| 2009/0119167 A1* | 5/2009 | Kendall | G06Q 30/0275 705/14.17 |
| 2009/0119173 A1 | 5/2009 | Parsons et al. | |
| 2009/0171748 A1* | 7/2009 | Aven et al. | 705/10 |
| 2009/0172551 A1 | 7/2009 | Kane et al. | |
| 2009/0217178 A1 | 8/2009 | Niyogi et al. | |
| 2009/0228335 A1 | 9/2009 | Niyogi et al. | |
| 2013/0055097 A1 | 2/2013 | Soroca et al. | |
| 2013/0297623 A1 | 11/2013 | Niyogi et al. | |
| 2015/0154309 A1 | 6/2015 | Niyogi et al. | |

OTHER PUBLICATIONS

Non-final Office Action dated Oct. 12, 2011 in U.S. Appl. No. 12/277,237, 8 pages.
Notice of Allowance dated Jun. 19, 2013 in U.S. Appl. No. 12/277,237, 11 pages.
Non-final Office Action dated Apr. 11, 2014 in U.S. Appl. No. 13/932,224, 13 pages.
Notice of Allowance dated Jan. 15, 2016 in U.S. Appl. No. 14/551,843.
International Search Report and Written Opinion for corresponding International Application No. PCT/US2009/035314, dated Oct. 8, 2009.
Non-final Office Action dated Jan. 11, 2016 in U.S. Appl. No. 12/580,176.
Non-final Office Action dated Apr. 23, 2015 in U.S. Appl. No. 12/580,176.
Non-final Office Action dated Sep. 19, 2014 in U.S. Appl. No. 12/580,176.
Non-final Office Action dated Mar. 26, 2012 in U.S. Appl. No. 12/580,176.
Final Office Action dated Jul. 22, 2016 in U.S. Appl. No. 12/580,176.
Non-final Office Action dated Oct. 23, 2013 in U.S. Appl. No. 13/932,224, 13 pages.
Notice of Allowance dated Jul. 23, 2014 in U.S. Appl. No. 13/932,224, 6 pages.
Non-final Office Action dated Jul. 30, 2015 in U.S. Appl. No. 14/551,843, 19 pages.

* cited by examiner

GENERATING AND PRESENTING TARGETED ADVERTISEMENTS INCLUDING REPRESENTATIONS OF SUBJECT INDIVIDUALS

CROSS-REFERENCES TO RELATED APPLICATIONS

This application claims priority from U.S. Provisional Application Ser. No. 61/031,692, for "Targeting Advertising Using Data Captured by Social Networks", filed on Feb. 26, 2008, which is incorporated herein by reference.

This application is related to U.S. Utility patent application Ser. No. 12/277,237 for "Ranking Interactions Between Users on the Internet", filed Nov. 24, 2008, which is incorporated herein by reference.

FIELD OF ART

The present disclosure is directed to generating and presenting targeted advertisements to users of the web, wherein such advertisements include representations of subject individuals.

DESCRIPTION OF RELATED ART

With the changing trend in the use of World Wide Web technology that aims to enhance creativity, information sharing, and, most notably, collaboration among users, there has been an evolution of web-based communities and hosted services in the form of social media. "Social media" is an umbrella term for activities that enable people to interlink and interact with engaging content in a conversational and participatory manner via the Internet. In essence, social media is used to describe how people socialize or interact with each other throughout the World Wide Web.

Social media includes, for example, social networks where users build profiles and friend lists, photo sharing websites, instant messaging applications, web-based email, retail sites where users can share wish lists, wedding planning sites that allow users to create personalized pages to share information about a wedding with guests, and combinations of several of these. Some social media, including social networks, have created open platforms so that external developers can write applications that use data captured by social media. Often, these applications correspond to advertising applications that provide for monetization of social media.

Advertising on the Internet generally attempts to maximize the effective cost per thousand impressions (eCPM). eCPM is a well-known measurement of advertising effectiveness that indicates how much each thousand units of an advertisement inventory costs an advertiser. The ranks of advertisements are computed by multiplying bid eCPM's by user scores (also referred to as quality scores). The advertisements with the highest ad rank are given preferential treatment. In the case of advertising opportunities where only one advertisement is displayed, preferential treatment means higher-ranked advertisements are displayed more often than lower-ranked advertisements. In a situation where multiple advertisements are displayed, preferential treatment means the advertisement is displayed more prominently than the others.

SUMMARY

According to various embodiments of the present invention, advertisements are generated and displayed to a user, wherein the advertisements portray other individuals, including friends with whom the user has interacted on the Internet and/or other contributors whom the user is likely to trust or pay attention to even if the user has not directly interacted with them. In the context of the present disclosure, a "friend" is an individual with whom the user interacts or has interacted, while a "contributor" is an individual that the user may not necessarily have interacted with. Contributors can include, for example, experts that have particular qualifications that render them trustworthy or well-respected with regard to particular subject matter, and/or any other individuals that have an opinion or other input they wish to share about the subject matter. Friends and contributors are referred to herein as "subject individuals". According to techniques described herein, subject individuals can be portrayed in advertisements presented to users. A subject individual need not have explicitly or implicitly referred an advertisement to a target user. A subject individual can be portrayed in an advertisement by including any type of representation of the subject individual, including representations that are visual, animated, text-based, numeric, icon-based, or of any other type; such representations can include a name, user ID, sketch, icon, handle, or any other indicator of the subject individual's identity, whether a fictional identity or an actual identity.

Advertisements are selected and/or generated based, in part, on a rank, or score, for subject individuals that are relevant to the user to whom the advertisement is targeted (the "target user").

In various embodiments, advertisements can be selected and presented to the target user based on any of a number of factors, taken alone or in combination. Such factors can include, for example: previous interactions of subject individuals relevant to the target user, where such previous interactions can take place directly with or in the advertisement; and/or other actions taken by subject individuals relevant to the target user, such as contributing related content in an environment other than an advertisement.

Conversely, the selection of advertisements for presentation to the user can be viewed as a process of eliminating some advertisements from a set of candidate advertisements. For example, it may be appropriate in some cases to eliminate an advertisement if no subject individuals have interacted with the advertisement. Similarly, it may be appropriate in some cases to eliminate an advertisement if no friends of the target user have interacted or contributed with the advertisement.

Once an advertisement has been selected for display to the target user, a particular subject individual (or more than one) is selected to be portrayed in the advertisement. Selection of subject individual can be based on various factors, including for example the target user's interaction history with subject individuals, a degree of authoritativeness of the subject individual with respect to the subject matter of the advertisement (based, for example, on expertise, actions, contributions, and/or contributed content), popularity of the subject individual, and potentially other factors.

Thus, according to various embodiments of the invention, a method is provided for choosing which advertisements) to show to a user and for selecting individuals to portray in the advertisements.

In one example, a contributor can be any individual who has submitted a review or opinion, whether or not the individual has any particular expertise on the subject of the review or opinion. In another example, a contributor can be an individual who has donated to a particular cause, so that the fact that the individual has donated may potentially influence other users to donate to the same cause. In general, the contributor can be any individual whose action, comment, submission, or other contribution might potentially influence the actions of other users, regardless of the actual merit or quality of the individual's action, comment, submission, or other contribution, and regardless of whether the contributor has any objective expertise on the relevant subject.

In this manner, the present invention provides a mechanism for presenting advertisements that the target user is more likely to act on, and/or for delivering a message that is inherently more relevant or valuable regardless of whether the target user acts, particularly since the advertisement includes a representation of a friend and/or relevant contributor.

Accordingly, using data from interactions among users via social media, the techniques described herein allow advertising networks to improve their web advertising display and advertising selection processes to show more engaging social advertising to users, and thereby increase the effectiveness of advertising efforts.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimable subject matter.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture

Figure 1:
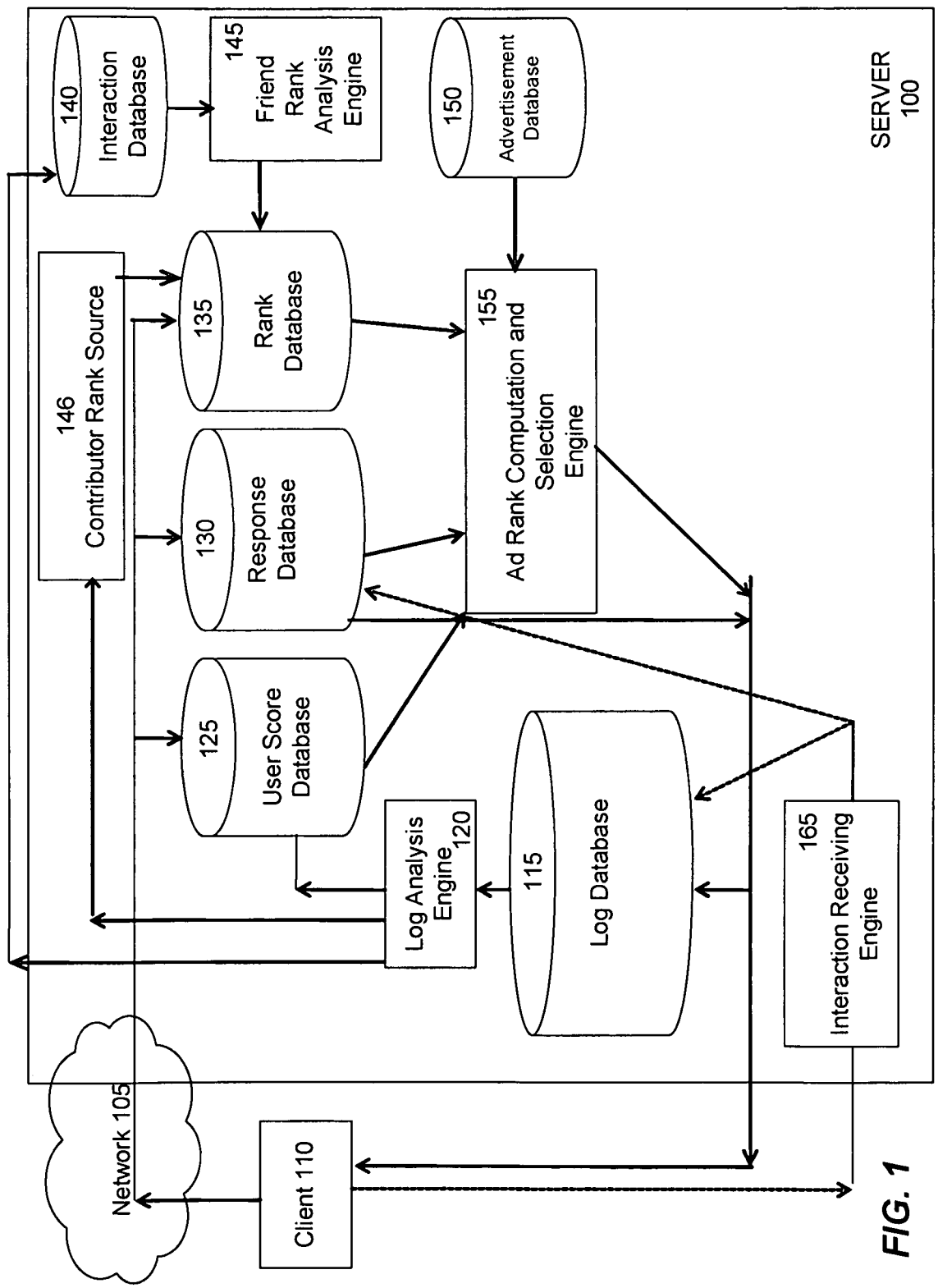
FIG. 1 illustrates a system architecture according to one embodiment.

FIG. 1 is a depiction of a system architecture and process flow according to one embodiment. The system comprises a client 110 and a server 100 which communicate with one another via the network 105. The server 100 comprises a log database 115, log analysis engine 120, user score database 125, response database 130, rank database 135, interaction database 140, friend rank analysis engine 145, advertisement ("ad") database 150, ad rank computation and selection engine 155, and an interaction receiving engine 165.

In one embodiment, the server 100 is implemented as server program executing on one or more server-class computers comprising a CPU, memory, network interface, peripheral interfaces, and other well known components. If more than one computer is present, they are communicatively coupled together. The computers themselves have generally high performance CPUs, with 1 GB or more of memory, and 100 GB or more of disk storage. Of course, other types of computers can be used, and it is expected that as more powerful computers are developed in the future, they can be configured in accordance with the teachings here. The functionality implemented by any of the elements can be provided from computer program products that are stored in tangible computer readable storage mediums (e.g., RAM, hard disk, or optical/magnetic media), or by equivalent implementations in hardware and/or firmware. Alternatively, the server 100 can be implemented in dedicated hardware, using custom-designed circuitry to implement the logic of the operations described herein.

Figure 2:
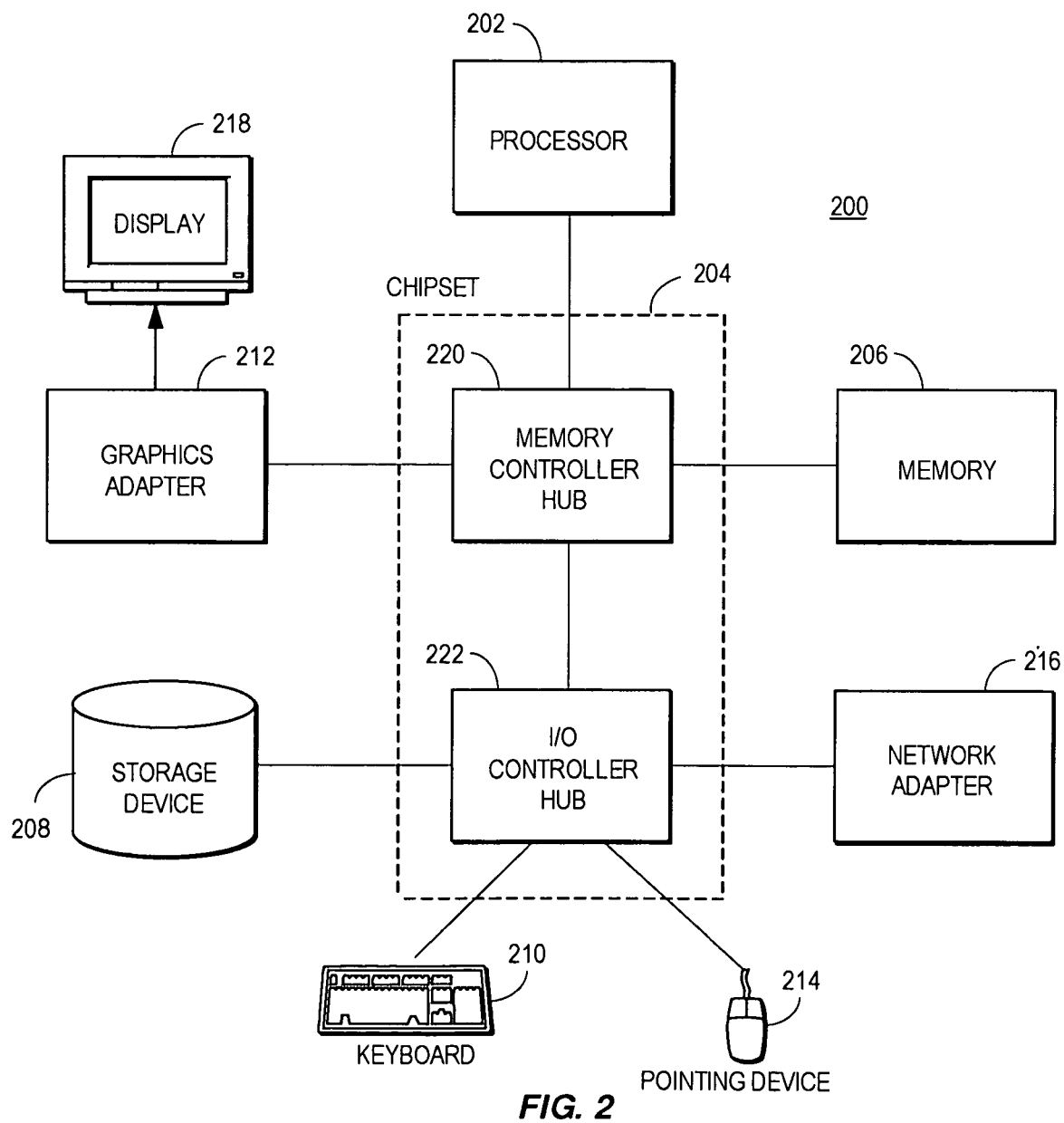
FIG. 2 illustrates one embodiment of a computer for implementing the present invention according to one embodiment.

FIG. 2 illustrates one embodiment of a computer on which the server 100 can be implemented. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is any device capable of holding data, for example, a hard drive, compact disk read-only memory (CD-ROM), DVD, or a solid-state memory device. The memory 206 holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to a local or wide area network.

As is known in the art, a computer 200 can have different and/or other components than those shown in FIG. 2. In addition, the computer 200 can lack certain illustrated components. In one embodiment, a computer 200 lacks a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program engines (or modules) for providing functionality described herein. As used herein, the term "engine" refers to computer program logic, running on the computer 200, utilized to provide the specified functionality. Thus, an engine can be implemented in hardware, firmware, and/or software. In one embodiment, program engines, such as the log analysis engine 120, friend rank analysis engine 145, ad rank computation and selection engine 155 and interaction receiving engine 165 are stored on the storage device 208, loaded into the memory 206, and executed by the processor 202.

Embodiments of the entities described herein can include other and/or different engines than the ones described here. In addition, the functionality attributed to the engines can be performed by other or different engines in other embodiments. Moreover, this description occasionally omits the term "engine" for purposes of clarity and convenience.

In one embodiment, the client 110 is a browser running on a computing device. The browser can be any browser known in the art, for example, Microsoft Internet Explorer™ or Mozilla Firefox™. The computing device is any computing device, such as a personal computer, a notebook computer, or a mobile device such as a smart phone or personal digital assistant. For simplicity and ease of discussion, only one client 110 is shown. It is noted however, that the disclosed configuration functions with numerous clients 110 communicating with the server 100. The network 105 is any network, wired or wireless known in the art.

The log database 115 stores user histories including representations of users' interactions on the Internet. Interactions can include interactions with other users as well as interactions with applications. Examples of interactions with applications include running a search query at a search engine, making a purchase at an on-line retailer, and/or interactions related to an advertisement. Examples of interactions related to an advertisement include actions before and after viewing an advertisement, such as: the history of the user's browser that is being sent an advertisement, the history of the user's browser having received an advertisement, the user interacting with an advertisement through mouse-over or click events, and post-click activity on web pages, such as filling out a form, making a purchase, or installing an application. The log database 115 is populated by the interaction receiving engine 165, which reviews traffic from the user at the client 110 for interactions with contributors. Data in the log database 115 can in turn be used to populate other databases in the system.

The log database 115 can store representations of interactions that take place in the context of an advertisement, as well as those that take place in other contexts. As an example, the log database 115 can store a representation of a user's interaction with a website, such as for example a review that a user A has submitted to a website or a questionnaire that user A has answered. Information that was recorded in connection with the submitted review or questionnaire response can then be displayed as part of an advertisement that is presented to another user B, whether or not user B has interacted with user A, and whether or not the two users have a relationship with each other.

As another example, the log database 115 can store information that is generated in connection with an application, such as a "share a mood" application. This information may correspond to information that might also be collected via a user's interaction with an advertisement.

Accordingly, data in the log database 115 can be collected based on user interaction with advertisements, and/or from other types of interactions and/or data sources. When collected from non-advertisement-based sources, the data may or may not be similar to information collected from advertisement-based sources. Regardless of the source of data in the log database 115, the data can be provided to users who have had an interaction with the user from whom the data was collected. Alternatively, in some embodiments, the data may be provided to any user, for example via the web, regardless of whether the recipient of the data has had an interaction with the user from whom the data was collected. In one embodiment, the determination as to how the data should be made available is dependent on the preferences of the user from whom the data was collected. In other embodiments, the determination can be made based on any of a number of factors.

The log analysis engine 120 determines a score for each user, $s(U)$. In one embodiment, this score is an aggregate of the user's behavior in response to interactions that have been logged in the log database 115. For example, the score for a user can indicate how likely the user is to click on a social advertisement, wherein a social advertisement is one that portrays either i) a friend of the user from a social network; or ii) a contributor with regard to subject matter of the advertisement.

In one embodiment, the user's score is determined from the combination of at least two groups of measurements. The first group includes summary statistics of how a particular user responds to social advertisements. Specifically, in one embodiment, the first group of statistics can include, for example:

(i) # of impressions of social advertisements shown to user, across all friends, over a pre-determined time period of N days;
(ii) # of "interactions" generated by social advertisements for impressions of (i);
(iii) # of clicks to an advertiser landing page for impressions of (i);
(iv) # of actions after the landing page for impressions of (i);
(v) interaction rate computed from (i) and (ii);
(vi) clickthrough rate computed from (i) and (iii);
(vii) conversion rate computed from (i) and (iv).

The second group includes summary statistics of how all users respond to social advertisements. Specifically, in one embodiment, the second group of statistics can include, for example:

(i)' # of impressions of social advertisements shown to all users, across all friends, over a pre-determined time period of N days;
(ii)' # of "interactions" generated by social advertisements for impressions of (i);
(iii)' # of clicks to an advertiser landing page for impressions of (i);
(iv)' # of actions after the landing page for impressions of (i);
(v)' interaction rate computed from (i) and (ii);
(vi)' clickthrough rate computed from (i) and (iii);
(vii)' conversion rate computed from (i) and (iv).

In one embodiment, the user's score is a function of either the ratio of the user's interaction rate, v, to all users' interactions rate, v'; the user's clickthrough rate, vi, to all users' clickthrough rate, vi'; or the user's conversion rate, vii, to all users' conversation rate, vii'. Which of these ratios is used depends on the method of selling the advertisements. The interactions rate, clickthrough rate and conversion rate shown here as components of the determination of a user score are conventional measurements used to price advertising on the Internet. The interaction rate is based on the number views of an advertisement. The clickthrough rate is based on the number clicks on an advertisement and the conversion rate is based on the number of purchases or other desired action the user undertakes after clicking on an advertisement.

In various embodiments, for advertisements that are sold per impression or per interaction, the user score is based on the interactions, v, for advertisements sold per click, the user score is based on the clickthrough rate, vi, and for advertisements sold per action, the user score is based on the conversion rate, vii. The function applied to the ratio can be, for example, the identity function or a sigmoid function.

Scores for users are stored in the user score database 125. Determination of user scores by the log analysis engine 120 may occur asynchronously from the choosing and displaying of an advertisement to a user. User scores can be updated, for example, at predetermined intervals, such once a day, once a week, or once a month.

It is noted that there may be instances in which there is not enough information known about a particular user for a user score to be a valid predictor. In such an instance any probabilistic technique can be employed, such as Gibbs sampling, which considers the user score to be a random variable.

The response database 130 stores responses to advertisements and/or other forms of contributions or input relevant to the subject matter of advertisements. Such responses and other input can be received from friends and/or from other individuals (referred to herein as "contributors"). A friend is any individual with which the user has had an interaction on the Internet, while a contributor may be any individual regardless of whether the user has had an interaction with the individual.

For example, friends can include individuals for whom the user has email addresses in an online address book. Online address books include address books at email applications such as Yahoo! Mail™ and GMail™. Online address books also include address books stored at websites from which a user sends links to other users. An example is Kodak Picture Gallery™. Friends can also include other individuals that the user has designated as a friend in a social network such as Facebook™ and MySpace™.

The response database 130 may assume any number of forms, such as a relational database, a memory-based key-value pair storage system, or flat file format for rapid lookup. In one embodiment, a memory key-value system is loaded with a set of flat files built from a relational database of interactions.

The interaction database 140 stores metadata about interactions between a user and the user's friends. This metadata can be used, for example, in determining an interaction score that is used to determine ranks for the user's friends. In one embodiment, metadata for a given interaction includes such information as: the social media site at which the interaction occurred; the application via which the interaction occurred; the publisher of the application, if applicable; the type of interaction; what the interaction was; the user(s) involved; date and time of the interaction; and how many recipients there were of the interaction. In one embodiment, metadata stored in the interaction database 140 for a given interaction is stored in a uniform format so that the entries are comparable across the various contexts in which interactions occur on the Internet.

The friend rank analysis engine 145 computes the ranks of a user's friends. In one embodiment, this analysis comprises determining an interaction score based on data from the interaction database 140 and thereby determining a rank for each of the user's friends, to be stored in the rank database 135. This rank is a statistical indication of how much more likely a user is to click on a social advertisement given that it indicates the advertisement is directed from a specific friend. In one embodiment, this rank is determined using weighted sums of counts of interaction data using Formula (I).

$$r(U, F) = \frac{\sum_{i=1}^{n} w_i c_i(U, F)}{\sum_{x} \sum_{i=1}^{n} w_i c_i(U, x)} \tag{I}$$

wherein: $c_i(U,F)$ is a count of one type of interaction between a given user, U, and a given friend, F, n=number of different types of interactions, x is any one of the user's friends, and $w_i$ is the weight given to each type of interaction. Friend rank is described in further detail in co-pending U.S. Utility patent application Ser. No. 12/277,237 for "Ranking Interactions Between Users on the Internet", filed Nov. 24, 2008, which is incorporated herein by reference.

Interaction types include various mechanisms by which a user can interact with his or her friends. Examples including a user visiting another user's page within a social network or wedding planning site, visiting the blog of a friend, viewing photos shared by a friend at a photo sharing site, explicit hyperlinking of one user to another user's page, explicit actions by one user with another user enabled by social networks and social applications, or the like. In many cases, advertising networks may observe these interactions with an HTTP_REFERER uniform resource locator ("URL") attribute, as is available when serving advertisements to users.

Additional interaction types include gifts exchanged between the user and the user's friends using a social network's "gifting applications," messages sent, invitations, interactions between a user and the user's friends via social advertisements, news feed clicks and participation by the user in other social media applications. Examples of interactions within a social network include updating a map on the user's page to add a recent trip, a user going into a drink-sending application, choosing a drink, choosing a friend, adding a message, and sending the friend that drink. Interactions between users may be synchronous or asynchronous.

In one embodiment, each interaction type is given a weight, $w_i$. For example, a message and an invitation might have a weight of 0.1, the sending of a gift using the gift application of the social network might have a weight of 0.2, and an interaction via a social advertisement might have a weight of 0.5. Other weights might be applied to other types of interactions, including interactions that may take place between users who do not know each other.

The resulting friend ranks are stored in the rank database 135. The friend rank computed by the friend rank analysis engine 145 may operate asynchronously from the process of choosing and displaying an advertisement to a user. The friend rank may be pre-computed at pre-determined intervals (such as, for example, once every 24 hours, once a week, or once a month) or computed in real time from sufficient statistics.

In some embodiments, the present invention is adapted to operate in contexts where an individual presented in an advertisement is some contributor whose opinion and/or actions may carry greater relevance than would the opinion of an ordinary user, even to those who do not personally know the contributor. A contributor can be an individual having particular expertise, or can be anyone who has provided an opinion, submitted a review, or performed some other action with respect to the subject matter of interest. Since the user would not necessarily have had any direct interactions with such a contributor, a rank can be developed based on some other mechanism, such as based on an overall assessment of the quality of the contributor's reviews or the overall value of his or her credentials. This rank is referred to as a contributor rank. Friend rank and contributor rank are referred to herein collectively as "subject individual rank" (or simply "rank"), and are stored in the rank database 135; friends and contributors are referred to herein collectively as "subject individuals".

Accordingly, in one embodiment, rank database 135 can include friend ranks as well as contributor ranks, where friend ranks are derived based on direct interactions between the friend and the user, and contributor ranks are obtained via other means, such as (for example) an indication of the popularity of the contributor. These contributor ranks can be obtained from any source 146; for example, contributor ranks for contributors can be obtained from an API provided by a social media website that provides an indication as to how many followers the contributor has, or some other indication of the relative popularity or trustworthiness of the individual. Such API's are available for most social media websites. In one embodiment, data from the log analysis engine 120 is used by the contributor rank source 146 to generate contributor ranks.

Additionally or alternatively, contributor ranks can be determined based on the relative performance of advertisements containing the contributor's identity and/or contributed content; this assessment can be made, for example, using data from the log analysis engine to create internal contributor rank sources. Such internal sources may measure, for example, aggregate click-through rate for advertisements portraying the contributor and/or contributed content, aggregate ratings of the contributor's content, number of comments about the contributor's content, and/or any other methods of evaluating the contributor and/or contributed content. Performance and favorability statistics can also be gathered in other contexts, such as when the contributor and/or contributed content are displayed in environments other than directly in an advertisement, such as a landing page, widget, email message, or other content distribution construct.

In one embodiment, friend ranks may differ from one user to another, even for the same subject individual; for example, a subject individual's friend rank may be higher for user A than for user B, if the subject individual has had more interactions with user A than to user B. In one embodiment, a contributor rank for a given subject individual at a given time is applicable to all users (although it may change over time); for example, a contributor rank may be based on an overall assessment of the subject individual's contributed content, based on comments and/or ratings submitted by the general public.

Thus, in one embodiment, the system of the present invention obtains friend ranks for friends (i.e., individuals with whom the user has had interactions) based on the nature and degree of such interactions. As described above, for those individuals with whom the user has not had interactions (i.e., contributors), the system of the present invention obtains contributor ranks based on some other measure, which preferably reflects the degree of the individual's authoritativeness (based on expertise, experience, and/or other qualifications) with respect to the subject matter of an advertisement.

In one embodiment, friend ranks and contributor ranks are normalized so that they can be meaningfully compared with one another. Alternatively, if friend ranks are not available for some subset of candidate advertisements, contributor ranks can be used, ignoring any friend ranks that may only be available for some of the candidate advertisements.

The advertisement database 150 stores advertisements that can potentially be displayed to users. Advertisements may be displayed to a user when the user visits a website on the Internet. Alternatively, the advertisement can be sent to a user electronically, such as via email, instant message, telephone call, via a social network, or the like. Additionally or alternatively, messages can be sent using a social message utility such as Twitter™.

The ad rank computation and selection engine 155 determines ranks of advertisements for a particular user; these ranks are referred to as "AdRanks". In one embodiment, this determination includes a computation involving the eCPM, user score, and aggregated subject individual ranks. A subject individual rank may be a friend rank for a friend of the user. Ranks can also, in one embodiment, include contributor ranks for individuals whose authoritativeness (including expertise, experience, and/or other qualifications) are relevant to the advertisement; for example, contributor rank can represent an overall assessment of the quality of an individual's reviews or the overall value of his or her credentials. In one embodiment, the aggregated rank is an aggregation including both friend rank(s) and contributor rank(s).

For example, ad rank can be computed as:

$$\text{Ad Rank} = eCPM * s(U) * \text{aggregated ranks for subject individuals}$$

where $s(U)$ represents the user score (also referred to as quality score).

The following is an example of the application of the above-described techniques. Rank values are shown for three subject individuals, who are friends F1, F2, F3 of a user U1, based on the friends' responses to advertisements A1 and A2.

| User | Subject individual | Ad | Rank |
|------|--------------------|------|------|
| U1   | F1                 | A1   | 1.5  |
| U1   | F2                 | A1   | 3.2  |
| U1   | F1                 | A2   | 1.6  |
| U1   | F3                 | A2   | 0.9  |

The above values can be aggregated as follows, to generate AdRank values for each advertisement:

| User | Subject individuals | Ad | AdRank(A) |
|------|---------------------|------|-----------|
| U1   | F1, F2              | A1   | Bid eCPM(A1) × f(1.5, 3.2) |
| U1   | F1, F3              | A2   | Bid eCPM(A2) × f(1.6, 0.9) |

That is, given friend rank data for specific response advertisements from friends, the AdRanks for specific advertisements can be computed from the individual responses using a combinator, f. This combinator can be the maximum value, geometric mean, arithmetic mean, or the like. Given such a combinatory function and subject individual ranks between users, AdRanks are developed. These AdRanks can then be used in eCPM auctions to determine which advertisement to show.

In one embodiment, the advertisement with the highest AdRank as computed by the above-described process is displayed (or otherwise output) to the user at the client 110. In another embodiment, some set of advertisements have AdRank scores exceeding a predefined threshold are identified, and one of the identified advertisements is selected for display (for example, based on a predefined rotation, random selection, ranking within the set of identified advertisements, or the like). Interactions that result from the user being displayed in an advertisement are logged by the interaction receiving engine 165.

In some embodiments, multiple advertisements may be displayed. Accordingly, some advertisements may be displayed more prominently than others, based (at least in part) on the relative AdRanks of the advertisements.

As described above, in one embodiment, the system of the present invention is able to compare advertisements portraying friends (individuals with whom the user has had an interaction) with advertisements portraying contributors (individuals with whom the user has not necessarily had an interaction), and to generate comparative ranks for each. The rank for a contributor can be determined based on the degree to which the contributor is considered authoritative with respect to the particular subject matter of the advertisement.

Extending the example above, suppose subject individual C1 is a contributor, with a high degree of authoritativeness relevant to the subject matter of advertisement A1. Then, ranks might be determined as follows:

| User | Subject individual | Ad | Rank |
|------|-------------------|-----|------|
| U1   | F1                | A1  | 1.5  |
| U1   | F2                | A1  | 3.2  |
| U1   | F1                | A2  | 1.6  |
| U1   | F3                | A2  | 0.9  |
| U1   | C1                | A1  | 5.0  |
| U1   | C1                | A2  | 0.0  |

Note that in this example, the authoritativeness of individual C1 is considered highly relevant for advertisement A1 but not relevant for advertisement A2. For example, A2 may be a subjective advertisement such as a "mood ad", wherein the advertisement portrays the mood of the friend; in such a case the mood of individual C1 would not be relevant to user U1, since user U1 does not know individual C1. Accordingly, the rank of C1 with respect to advertisement A1 is assigned the relatively high value of 5.0, while the rank of C1 with respect to advertisement A1 is assigned a value of zero.

The above values can be aggregated as follows, to generate AdRank values for each advertisement:

| User | Subject individuals | Ad | AdRank(A) |
|------|---------------------|-----|-----------|
| U1   | F1, F2, C1          | A1  | Bid eCPM(A1) × f(1.5, 3.2, 5.0) |
| U1   | F1, F3, C1          | A2  | Bid eCPM(A2) × f(1.6, 0.9, 0.0) |

In one embodiment, some set of candidate advertisements is available, and the system of the present invention selects an advertisement from the set of candidates. For example, in response to a client's 110 request for an advertisement, five candidate advertisements might be identified (based, for example, or certain demographic and/or geographic characteristics of the user associated with the client 110). Some of these candidate advertisements may be designated as "social advertisements" that only include friends, meaning that they will only be shown if a friend of the user has previously interacted with an equivalent advertisement. Thus, if no friends have interacted with a candidate (as determined based on data from the response database 130), that candidate is eliminated as a potential advertisement to be shown. Of those advertisements that remain, the system of the present invention determines which advertisement to show, and which friend to portray in the advertisement, based on the ad ranking mechanism described above. A representation of the selected friend is then inserted in the advertisement, and the advertisement is transmitted to the client 110 for display to the user. Alternatively, some candidate advertisements may be designated as "social advertisements" that may include all types of subject individuals, whether they are friends or not. In this case, the candidate advertisement may be considered for display to any user, ignoring other targeting and ad parameters, as long as there is at least one individual who has contributed content pertaining to the candidate advertisement (as determined based on data from the response database 130).

Process Flow

Figure 4:
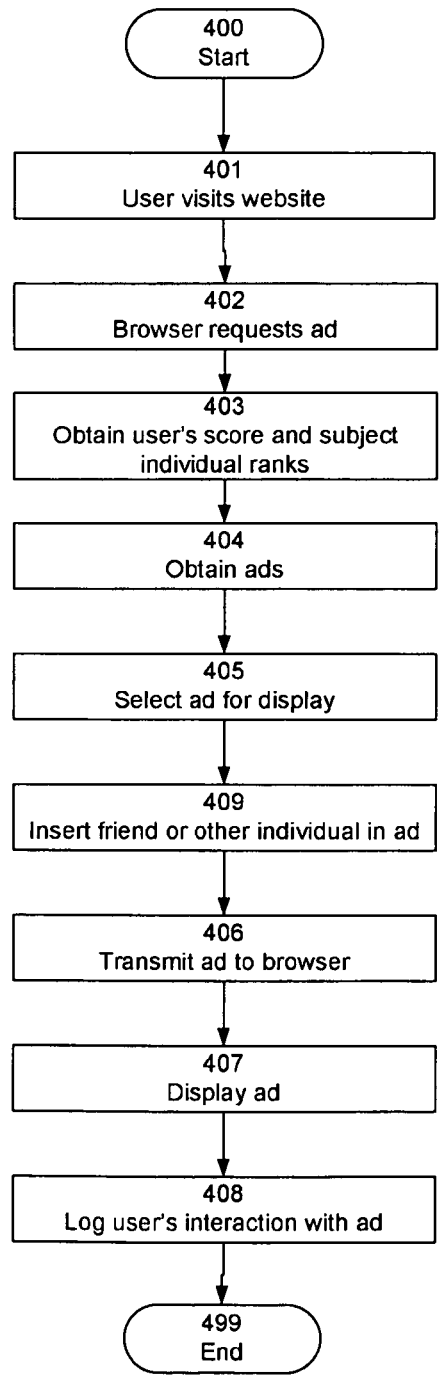
FIG. 4 is a flow diagram depicting a method for displaying an advertisement to a user according to one embodiment

Referring now also to FIG. 4, there is shown a flow diagram depicting a method for displaying an advertisement to a target user according to one embodiment. A target user visits 401 a website and the browser at the client 110 requests 402 an advertisement. The ad rank computation and selection engine 155 receives the request and in turn, and obtains 403 the target user's overall score s(U) from the user scores database 125 as well as subject individual ranks, which may include contributor ranks and/or friend ranks for the target user's friends from the friend rank database 135. The ad rank computation and selection engine 155 also obtains 404 advertisements from the advertisement database 150. Using the mechanism described previously, the ad rank computation and selection engine 155 selects 405 an advertisement (or advertisements) for display. If the subject individual (a friend or contributor) is not already depicted in the advertisement, he or she can be inserted 409 in the advertisement.

In one embodiment, insertion 409 of the subject individual is performed as follows. Each advertisement has at least one placeholder location in which the representation of the subject individual can be inserted. The placeholder location can be designated for a picture, name, animation, or other identifier. When the advertisement is rendered as HTML to be sent to the client 110, a representation of the subject individual is inserted at the location of the placeholder. One skilled in the art will recognize that many other mechanisms for inserting the subject individual's representation can be used, including for example insertion via Adobe™ Flash™ or some other multimedia software application. Alternatively, advertisements can be pre-rendered in static form, as a file in JPG, GIF, PNG or other image format, to include the subject individual along with other advertising content.

In one embodiment, the picture, name, animation or other representation of the subject individual is obtained from a database (not shown) containing such information for all potential subject individuals. The database can include actual images and other content, or can include links (pointers), for example in the form of URLs.

The selected advertisement is then transmitted 406 to the target user's browser at the client 110, which displays 407 the advertisement.

As discussed above, in one embodiment, the displayed advertisement may portray any subject individual, including a friend of the target user, or any other individual with whom the friend has interacted, for example in the context of a social media application (which may or may not be the same social media application in which the advertisement is being presented). In another embodiment, the subject individual portrayed in an advertisement may be an individual that the target user has not necessarily interacted with; the individual in the advertisement may be a contributor or other individual whose opinion, expertise, or action may be relevant to the subject matter of the advertisement. In this manner, effectiveness of the advertisement is improved, because the target user is more likely to pay attention to and/or trust the content of the advertisement when the advertisement includes a portrayal of a friend, contributor, and/or other trusted individual. The target user's interaction with the advertisement is logged 408 at the interaction receiving engine 165.

Example User Interfaces and Interactions

Figure 3A:
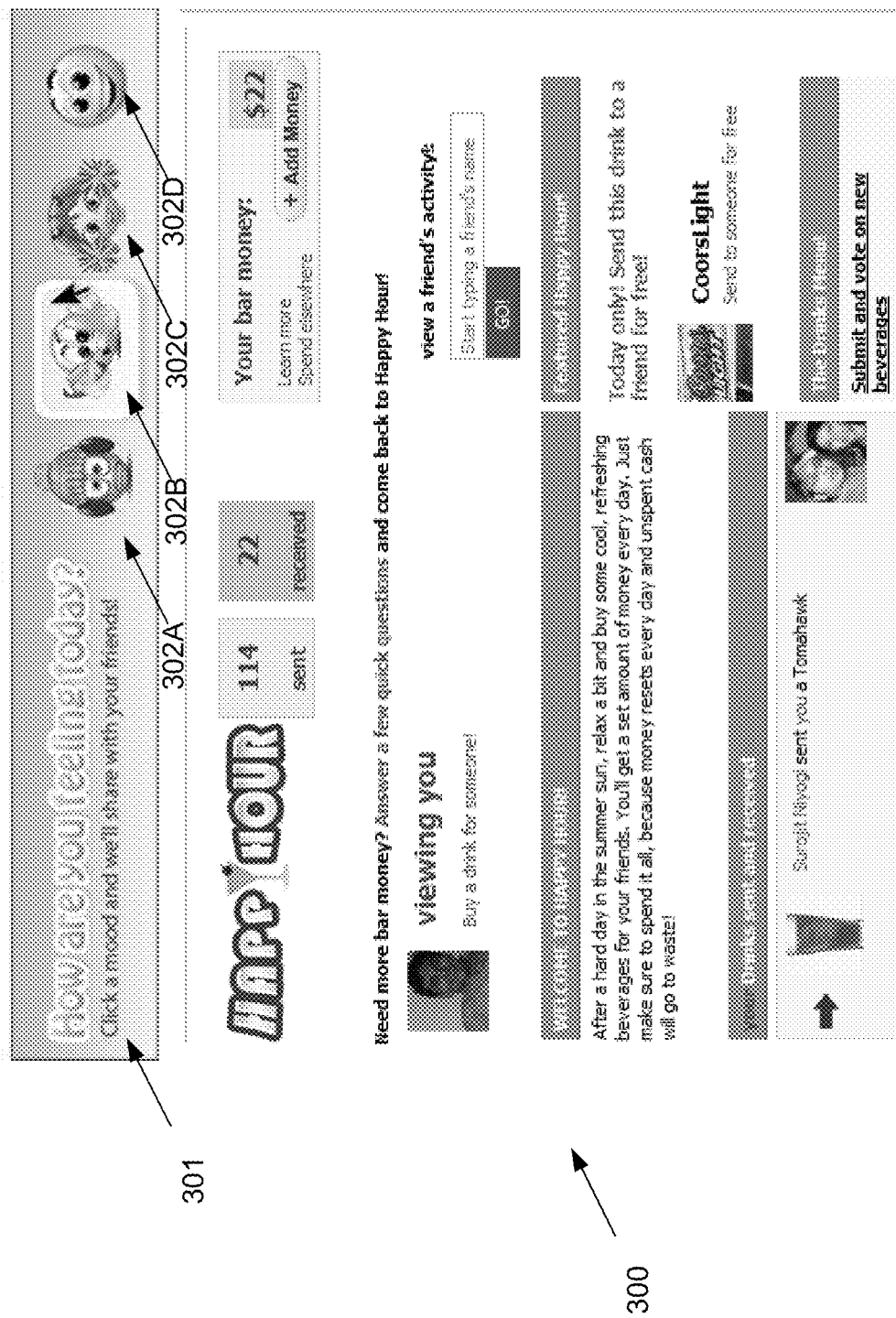
FIG. 3A illustrates a screenshot of a user interface displaying an advertisement to a first user according to one embodiment.

Referring now to FIG. 3A, there is shown a screenshot 300 of a user interface displaying an advertisement 301 to a first user according to one embodiment. The advertisement invites the first user (a subject individual) to respond to the question about how the first user is feeling today, by selecting among icons 302A-D. The first user chooses mood icon 302B as a response and that response is transmitted to the system and stored in the log database 115.

Figure 3B:
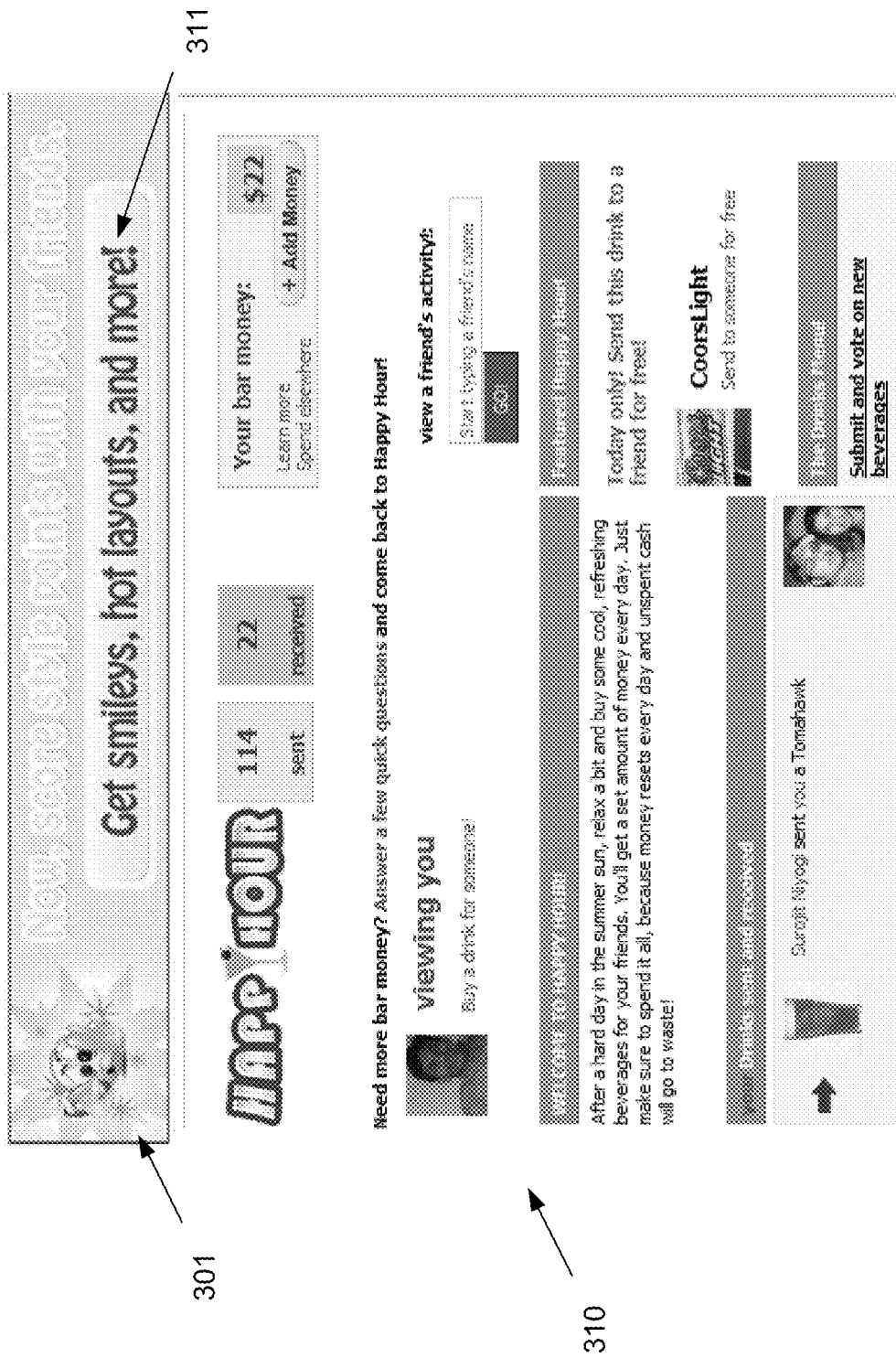
FIG. 3B illustrates a screenshot of a user interface displaying the interface after the first user has interacted with the advertisement, according to one embodiment.

Referring now to FIG. 3B, there is shown a screenshot 310 of a user interface, according to one embodiment, displaying the interface after the first user has interacted with the advertisement 301. The advertisement 301 now reflects the first user's choice of mood and invites the first user to click through the advertisement (by clicking on button 311) to access the advertiser's website. The first user's interaction with the advertisement 301, such as clicking on button 311, is stored in the log database 115.

Figure 3C:
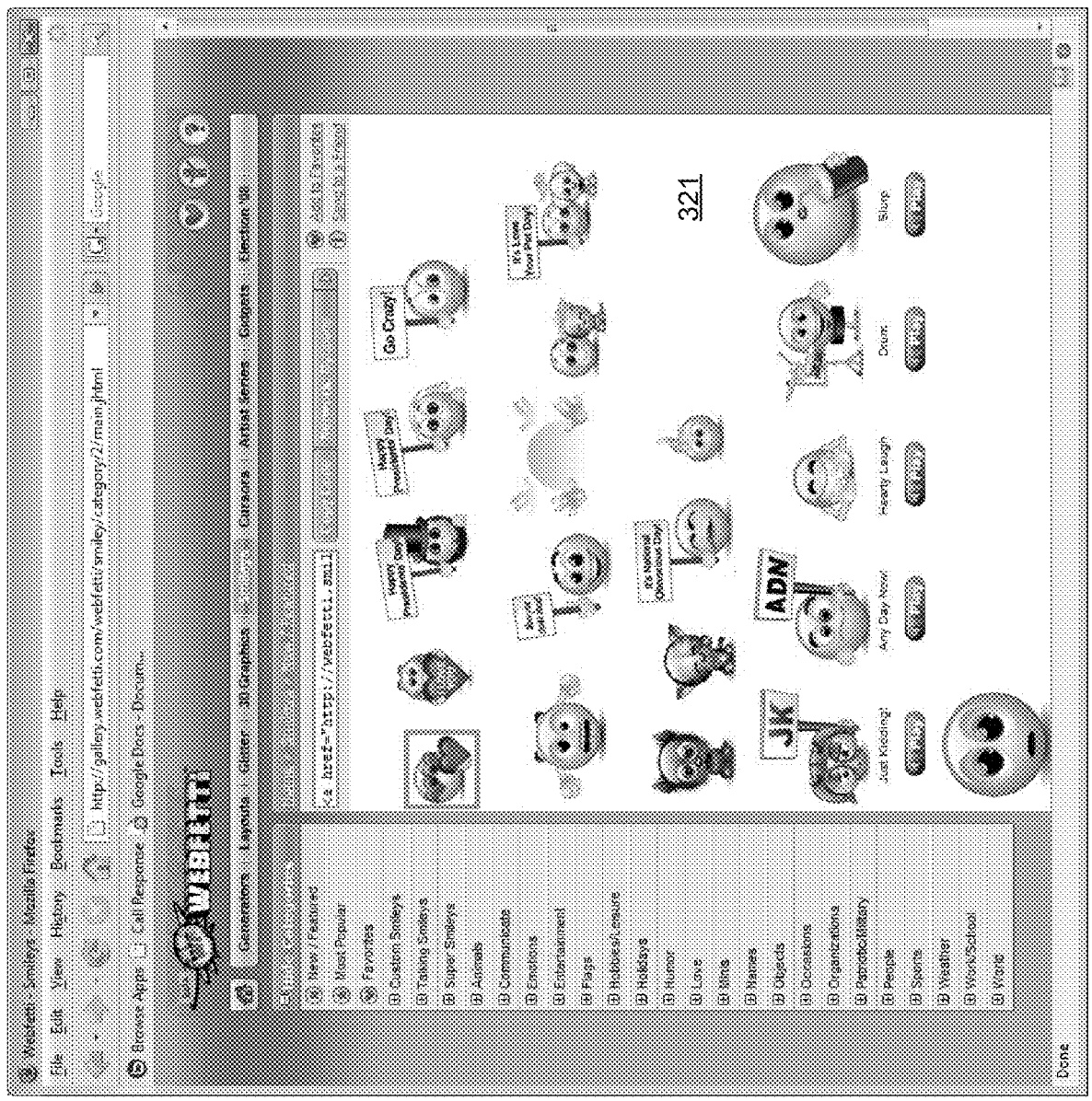
FIG. 3C illustrates a screenshot of a user interface displaying the advertiser's site as it appears after the first user has clicked through the advertisement, according to one embodiment.

Referring now to FIG. 3C, there is shown a screenshot 320 of a user interface, according to one embodiment, displaying the advertiser's website 321 as it appears after the first user has clicked on button 311 in the advertisement 301 of FIG. 3B. The first user's interactions with the advertiser's website 321, including for example, purchases, are stored in the log database 115.

Figure 3D:
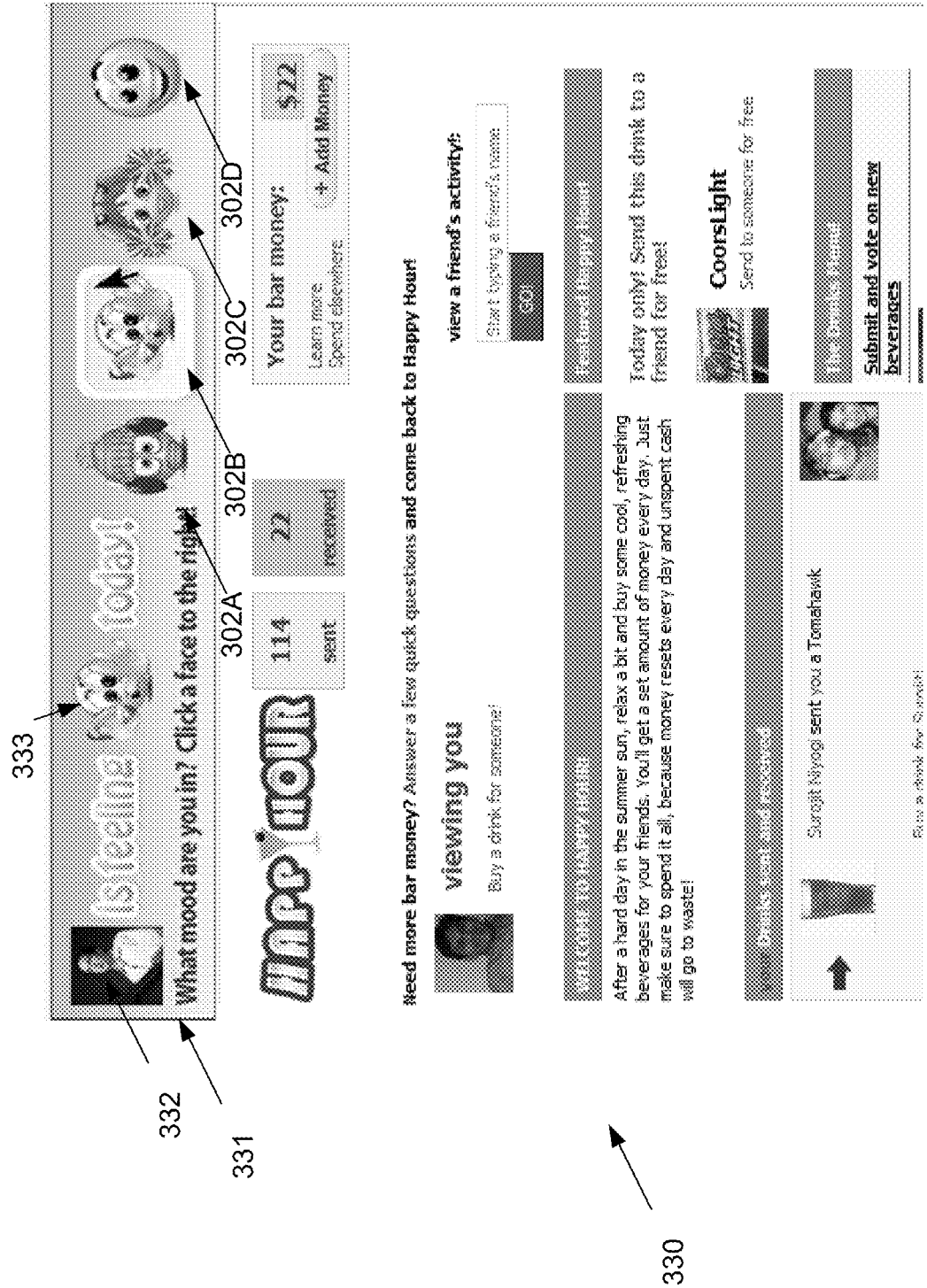
FIG. 3D illustrates a screenshot of a user interface displaying to a second user an advertisement portraying the first user, according to one embodiment.

As described above, the first user's interactions with the advertisement 301 can be used in the generation and presentation of an advertisement for a second user, so that the first user becomes a subject individual portrayed in the advertisement shown to the second user. Referring now to FIG. 3D, there is shown a screenshot 330 of a user interface, according to one embodiment, displaying to a second user an advertisement 331 including a portrayal, or representation 332, of the first user. In the example of FIG. 3D, representation 322 is a photograph; however, one skilled in the art will recognize that the representation 332 can be a name, user ID, sketch, icon, handle, or any other indicator of the first user's identity, whether a fictional identity or an actual identity. The representation 332 can be visual, animated, text-based, numeric, icon-based, or of any other type.

In one embodiment, a screenshot 330 such as shown in FIG. 3D can be generated according to the process flow described above in connection with FIGS. 1 and 4. Thus, prior to displaying the advertisement 331 in Fig. D, the system of the present invention determines an advertisement to display and selects a subject individual (friend or contributor) to portray in the advertisement. In this example, the subject individual shown in the advertisement 331 is the first user (i.e., the user who interacted with the advertisement 301 shown in FIG. 3A), as this first user has been identified as a friend of the second user.

In this example, the advertisement 331 shown in FIG. 3D informs the second user how the first user is feeling, by including a representation 332 of the first user along with an icon 333 corresponding to the mood icon 102 selected by the first user in FIG. 3A. The second user is then invited to select an icon 302A-D that illustrates the second user's mood. When the second user does so, by clicking on icon 302B, the response is stored in the log database 115.

Figure 3E:
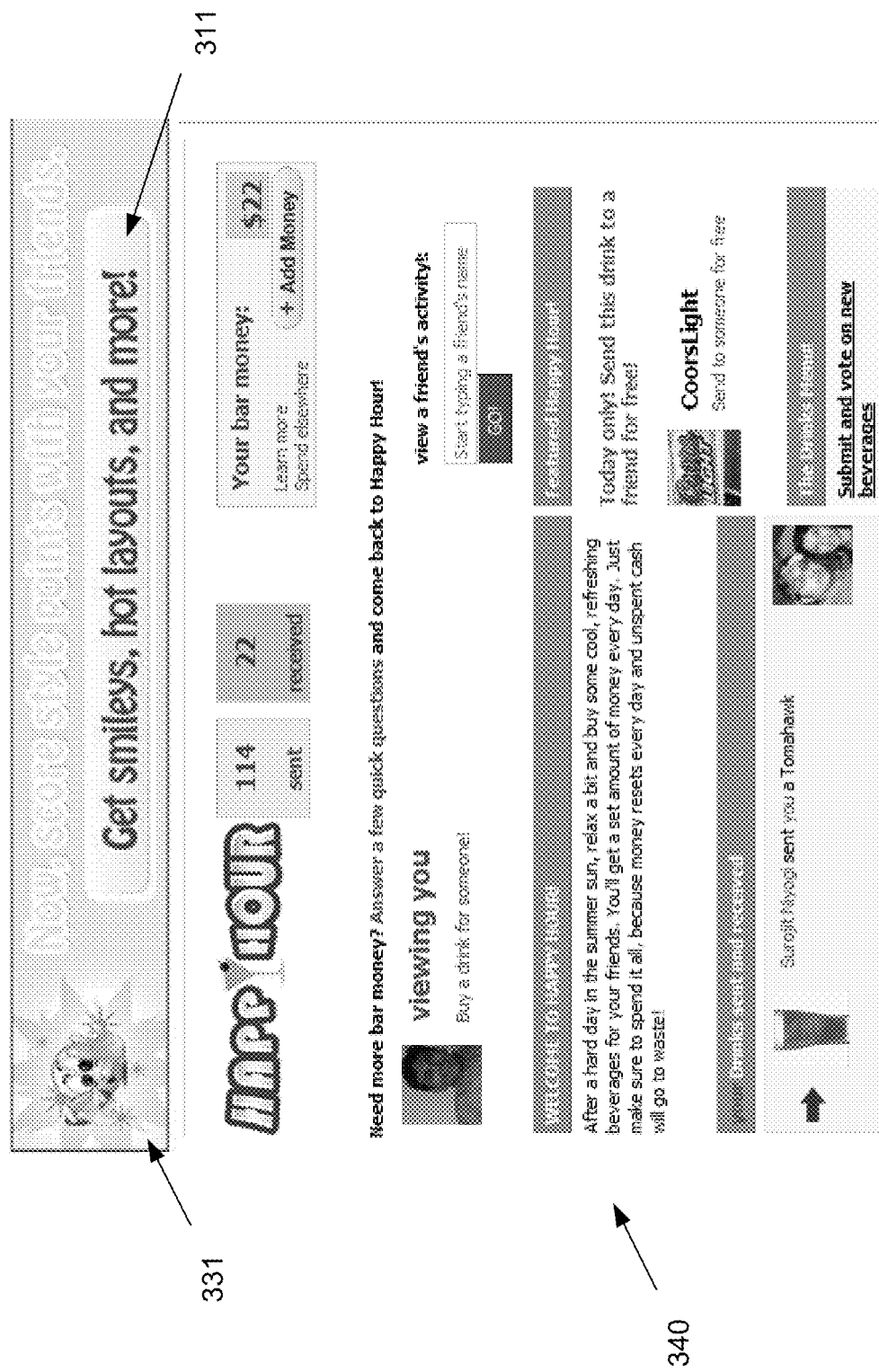
FIG. 3E illustrates a screenshot of a user interface displaying the interface after the second user has interacted with the advertisement, according to one embodiment.

Referring now to FIG. 3E, there is shown a screenshot 340 of a user interface, according to one embodiment, displaying the interface after the second user has interacted with the advertisement 331. The advertisement 331 now reflects the first user's choice of mood and invites the second user to click through the advertisement (by clicking on button 311) to access the advertiser's website. The second user's interaction with the advertisement 331, such as clicking on button 311, is stored in the log database 115.

Referring again to FIG. 3C, there is shown a screenshot 320 of a user interface, according to one embodiment, displaying the advertiser's website 321 as it appears after the second user has clicked on button 311 in the advertisement 331 of FIG. 3E. The second user's interactions with the advertiser's website 321, including for example, purchases, are stored in the log database 115.

In the above description, for illustrative purposes, advertisements are depicted as visual components of web pages. However, one skilled in the art will recognize that advertisements selected and presented in connection with the present invention can take any form, including visual, auditory, text-based, or any combination thereof. For example, and without limitation, advertisements can be animations, audio messages, text messages, email messages, multimedia messages, or the like. Advertisements may or may not conform to accepted standards such as those promulgated by the Internet Architecture Board (IAB), and may be static or dynamic in size.

Broadcasting User Interactions

In one embodiment, the interactions of a user (i.e., a subject individual) with an advertisement are made publicly available, for example via an advertisement that is broadcast via the web or by any other communications medium. Thus, an advertisement can be broadcast that includes a representation (such as a photograph, name, or other identifier) of a subject individual who has interacted with the same advertisement, or who has interacted with another advertisement. In another embodiment, the broadcast advertisement can include a representation of a user (i.e., a subject individual) who has otherwise contributed an opinion or response relevant to the subject matter of the advertisement, such as by submitting a review or answering a questionnaire. The advertisement can be broadcast to the general public, or to a selected group of individuals based on some characteristic (such as demographics, geography, subject matter of interest, website visited, and the like). The determination of which users should receive the advertisement can be made based on any parameters or characteristics, including for example a computed affinity or similarity between the subject individual and the user being presented the advertisement. Such an affinity or similarity can be used as a basis for presenting the advertisement to a user even if that user does not necessarily know the subject individual.

An advertisement shown in such an embodiment would resemble the advertisement 311 depicted in FIG. 3D, where the representation 332 portrays a subject individual who has interacted with the same advertisement, or who has interacted with another advertisement. Here, however, the advertisement 311 is broadcast to the general public or to a selected group of individuals based on some characteristic, regardless of whether or not the target individuals personally know (or have interacted with) the subject individual. In this example, previous to broadcasting this advertisement 311, the subject individual portrayed in the representation 332 has interacted with this or another advertisement to indicate that he is in a certain mood, designated by the icon 302B.

In the above description, the invention has been described in the context of an embodiment wherein responses of friends and other contributors are considered, and wherein friends and/or other contributors can be portrayed in advertisements to a target user. One skilled in the art will recognize that other embodiments can be implemented, including for example an embodiment where only the responses of friends are considered, and only friends of the target user are eligible to be presented in advertisements.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

In addition, some portions of the detailed description, such as the processes described in reference to FIG. 1, are presented in terms of algorithms and symbolic representations of operations on data bits within a computer memory, such as memory 206. These algorithmic descriptions and representations are the means used by those skilled in the data processing arts to most effectively convey the substance of their work to others skilled in the art. An algorithm is here, and generally, conceived to be a self-consistent sequence of processing steps (instructions) that, when executed by a processor such as processor 202, lead to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

Further, the features and advantages described in the specification provide a beneficial use to those making use of a system and a method as described in embodiments herein. For example, a user is provided mechanisms, e.g., by receiving and/or transmitting control signals, to control access to particular information as described herein. Further, these benefits accrue regardless of whether all or portions of components, e.g., server systems, to support their functionality are located locally or remotely relative to the user.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative systems and methods for targeted advertising using data captured by social networking applications in accordance with the disclosed principles herein. Thus, while particular embodiments and applications have been illustrated and described, it is to be understood that the embodiments are not limited to the precise construction and components disclosed herein and that various modifications, changes variations which will be apparent to those skilled in the art may be made in the arrangement, operation and details of the method and apparatus disclosed herein without departing from the spirit and scope of the disclosure and appended additional claimable subject matter.

What is claimed is:

1. A computer-implemented method for selecting and presenting an advertisement to a user, comprising:
receiving, via an interaction receiving engine, and recording, at a server, one or more indications of advertisement interactions, the one or more indications of advertisement interactions being received input at a client device associated with a user and indicative of activity between the client device and an advertisement displayed on the client device, the one or more indications of advertisement interactions comprising one or more of mouse-over events, click events, and post-click activity including providing information to a form, and causing an application to be installed;
receiving and storing, at an interaction database, metadata corresponding to one or more indications of social network interactions occurring between the client device associated with the user and at least one interacting subject individual using an Internet-based social network, wherein the metadata corresponding to each of the one or more indications of social network interactions is stored in a uniform format so as to enable comparison of the one or more indications of social network interactions to which the metadata corresponds;

receiving, at the server from the client device associated with the user, a request for the advertisement to be presented to the user;

for each of a plurality of candidate advertisements, determining, by the server, (i) at least one friend rank comprising a metric associated with the at least one interacting subject individual with whom the user has interacted using the Internet-based social network, wherein the at least one friend rank is determined at least in part by the received and stored metadata and (ii) at least one contributor rank indicating a degree of authoritativeness of a contributing subject individual with respect to subject matter of the advertisement, the at least one contributor rank not being based on social network interactions between the contributing subject individual and the user;

for each of the plurality of candidate advertisements, aggregating the at least one friend rank and the at least one contributor rank, and generating a score for each of the plurality of candidate advertisements based at least in part on the aggregated at least one friend rank and the at least one contributor rank, with the score differing from the at least one friend rank and the at least one contributor rank;

identifying a selected advertisement from the plurality of candidate advertisements based at least in part on the generated scores;

comparing at least one normalized contributor rank for the selected advertisement to at least one normalized friend rank for the selected advertisement;

selecting, based on the comparing, a represented subject individual associated with a normalized contributor rank for the selected advertisement that is greater than all of the at least one normalized friend rank for the selected advertisement, the represented subject individual having contributed input with respect to the subject matter of the advertisement and having at least one recorded indication of an interaction with the selected advertisement;

determining a location and a type of a placeholder in the selected advertisement;

obtaining, from a storage database by the server, a representation of the represented subject individual having a representation type that matches the type of the placeholder;

configuring, by the server, the selected advertisement to include the representation of the represented subject individual, obtained from the storage database, inserted at the determined location of the placeholder in the selected advertisement, wherein the representation includes an indication of an interaction between the represented subject individual and the advertisement through a web browser;

electronically transmitting visible indicia of the selected advertisement to a user interface of a display of the client device associated with the user, wherein, in response to receiving the selected advertisement, the client device associated with the user is configured to display, via the display of the client device associated with the user, the selected advertisement that comprises the representation of the represented subject individual and enables user interaction by the user, via the user interface, with the visible indicia associated with the selected advertisement; and detecting, via the user interface, and storing an interaction of the user with the visible indicia of the selected advertisement that comprises the representation of the represented subject individual.

2. The method of claim 1, wherein the representation of the represented subject individual comprises at least one selected from the group consisting of:
   a picture of the represented subject individual;
   a name of the represented subject individual;
   an icon representing the represented subject individual; and
   an identifier for the represented subject individual.

3. The method of claim 1, wherein identifying a selected advertisement based at least in part on the generated scores comprises identifying a selected advertisement having a generated score exceeding a threshold.

4. The method of claim 1, wherein the at least one friend rank comprises a friend rank associated with the at least one interacting subject individual with whom the user has interacted on an electronically implemented social network.

5. The method of claim 1, wherein the at least one friend rank comprises a friend rank indicating a degree of interaction between the user and the at least one interacting subject individual with whom the user has interacted.

6. The method of claim 1, wherein the at least one friend rank comprises a friend rank generated responsive to at least one interaction between the at least one interacting subject individual with whom the user has interacted and an Internet-based component associated with the advertisement.

7. The method of claim 1, wherein the representation of the represented subject individual comprises an indication of the represented subject individual's previous interaction with an advertisement.

8. The method of claim 1, wherein the selected advertisement is output as a component of a web page display.

9. The method of claim 1, wherein the selected advertisement comprises at least one selected from the group consisting of:
   an audio advertisement;
   an animated advertisement;
   a video;
   a text based advertisement;
   a text message;
   an instant message;
   an email message;
   a web page;
   a banner; and
   a portion of a web page.

10. The method of claim 1, further comprising:
   receiving the user's interaction with the advertisement; and storing the user's interaction in a storage medium.

11. The method of claim 1, wherein generating the score based at least in part on the aggregated at least one friend rank and the at least one contributor rank comprises generating the score based on the aggregated at least one friend rank and the at least one contributor rank combined with a user score based on the user's history of interactions on the Internet.

12. The method of claim 1, further comprising:
   detecting a mood of the represented subject individual from the visible indicia of the selected advertisement.

13. A computer program product for selecting and presenting an advertisement to a user, comprising:
   a computer-readable storage medium; and
   computer program code, encoded on the computer-readable storage medium, for causing an electronic device to perform the steps of:

receiving, via an interaction receiving engine, and recording, at a server, one or more indications of advertisement interactions, the one or more indications of advertisement interactions being received input at a client device associated with a user and indicative of activity between the client device and an advertisement displayed on the client device, the one or more indications of advertisement interactions comprising one or more of mouse-over events, click events, and post-click activity including providing information to a form, and causing an application to be installed;

receiving and storing, at an interaction database, metadata corresponding to one or more indications of social network interactions occurring between the client device associated with the user and at least one interacting subject individual using an Internet-based social network, wherein the metadata corresponding to each of the one or more indications of social network interactions is stored in a uniform format so as to enable comparison of the one or more indications of social network interactions to which the metadata corresponds;

receiving, at the server from the client device associated with the user, a request for the advertisement to be presented to the user;

for each of a plurality of candidate advertisements, determining, by the server, (i) at least one friend rank comprising a metric associated with the at least one interacting subject individual with whom the user has interacted using the Internet-based social network, wherein the at least one friend rank is determined at least in part by the received and stored metadata and (ii) at least one contributor rank indicating a degree of authoritativeness of a contributing subject individual with respect to subject matter of the advertisement, the at least one contributor rank not being based on social network interactions between the contributing subject individual and the user;

for each of the plurality of candidate advertisements, aggregating the at least one friend rank and the at least one contributor rank, and generating a score for each of the plurality of candidate advertisements based at least in part on the aggregated at least one friend rank and the at least one contributor rank, with the score differing from the at least one friend rank and the at least one contributor rank;

identifying a selected advertisement from the plurality of candidate advertisements based at least in part on the generated scores;

comparing at least one normalized contributor rank for the selected advertisement to at least one normalized friend rank for the selected advertisement;

selecting, based on the comparing, a represented subject individual associated with a normalized contributor rank for the selected advertisement that is greater than all of the at least one normalized friend rank for the selected advertisement, the represented subject individual having contributed input with respect to the subject matter of the advertisement and having at least one recorded indication of an interaction with the selected advertisement;

determining a location and a type of a placeholder in the selected advertisement;

obtaining, from a storage database by the server, a representation of the represented subject individual having a representation type that matches the type of the placeholder;

configuring, by the server, the selected advertisement to include the representation of the represented subject individual, obtained from the storage database, inserted at the determined location of the placeholder in the selected advertisement, wherein the representation includes an indication of an interaction between the represented subject individual and the advertisement through a web browser;

electronically transmitting visible indicia of the selected advertisement to a user interface of a display of the client device associated with the user, wherein, in response to receiving the selected advertisement, the client device associated with the user is configured to display, via the display of the client device associated with the user, the selected advertisement that comprises the representation of the represented subject individual and enables user interaction by the user, via the user interface, with the visible indicia associated with the selected advertisement; and detecting, via the user interface, and storing an interaction of the user with the visible indicia of the selected advertisement that comprises the representation of the represented subject individual.

14. The computer program product of claim 13, wherein the at least one friend rank comprises a friend rank associated with the at least one interacting subject individual with whom the user has interacted on an electronically implemented social network.

15. The computer program product of claim 13, wherein the at least one friend rank comprises a friend rank indicating a degree of interaction between the user and the at least one interacting subject individual with whom the user has interacted.

16. The computer program product of claim 13, wherein the at least one friend rank comprises a friend rank generated responsive to at least one interaction between the at least one interacting subject individual with whom the user has interacted and an Internet-based component associated with the advertisement.

17. The computer program product of claim 13, wherein the selected advertisement comprises at least one selected from the group consisting of:
an audio advertisement;
an animated advertisement;
a video;
a text based advertisement;
a text message;
an instant message;
an email message;
a web page;
a banner; and
a portion of a web page.

18. The computer program product of claim 13, further comprising computer program code for:
receiving the user's interaction with the advertisement; and
storing the user's interaction in a storage medium.

19. The computer program product of claim 13, further comprising computer program code for:
detecting a mood of the represented subject individual from the visible indicia of the selected advertisement.

20. A system for selecting and presenting an advertisement to a user, comprising:
an interaction receiving engine to receive one or more indications of advertisement interactions;
a database to record the one or more indications of advertisement interactions, indications of advertisement interactions being received input at a client device associated with a user indicative of activity between the client device associated with the user and an advertisement displayed on the client device associated with the user, the indications of advertisement interactions comprising one or more of mouse-over events, click events, and post-click activity including providing information to a form, and causing an application to be installed;

an interaction database to receive and record metadata corresponding to one or more indications of social network interactions occurring between the client device associated with the user and at least one interacting subject individual using an Internet-based social network, wherein the metadata corresponding to each of the one or more indications of social network interactions is stored in a uniform format so as to enable comparison of the one or more indications of social network interactions to which the metadata corresponds;

a server, to receive, from the client device associated with the user, a request for the advertisement to be presented to the user;

an advertisement rank computation and selection engine to:

for each of a plurality of candidate advertisements, determine at least one friend rank comprising a metric associated with the at least one interacting subject individual with whom the user has interacted using an Internet-based social network, and at least one contributor rank indicating a degree of authoritativeness of a contributing subject individual with respect to subject matter of the advertisement, the contributor rank not being based on social network interactions between the contributing subject individual and the user;

for each of the plurality of candidate advertisements, aggregate the at least one friend rank and the at least one contributor rank, and generate a score for each of the plurality of candidate advertisements based at least in part on the aggregated at least one friend rank and the at least one contributor rank, with the score differing from the at least one friend rank and the at least one contributor rank;

identify a selected advertisement from the plurality of candidate advertisements based at least in part on the generated scores;

comparing at least one normalized contributor rank for the selected advertisement to at least one normalized friend rank for the selected advertisement;

select, based on the comparing, a represented subject individual associated with a normalized contributor rank for the selected advertisement that is greater than all of the at least one normalized friend rank for the selected advertisement, the represented subject individual having contributed input with respect to the subject matter of the advertisement and having at least one recorded indication of an interaction with the selected advertisement;

determine a location and a type of a placeholder in the selected advertisement;

obtain, from a storage database by the server, a representation of the represented subject individual having a representation type that matches the type of the placeholder;

configure, by the server, the selected advertisement to include the representation of the represented subject individual, obtained from the storage database, inserted at the determined location of the placeholder in the selected advertisement, wherein the representation includes an indication of a transaction involving the interaction between the represented subject individual and the advertisement through a web browser;

a transmission device to electronically transmit visible indicia of the selected advertisement to a user interface of a display of the client device associated with the user, wherein, in response to receiving the selected advertisement, the client device associated with the user is configured to display, via the display, the selected advertisement that comprises the representation of the represented subject individual; and detect, via the user interface, and store an interaction of the user with the selected advertisement that comprises the representation of the represented subject individual.

21. The system of claim 20, wherein the at least one rank comprises a friend rank associated with the at least one interacting subject individual with whom the user has interacted on an electronically implemented social network.

22. The system of claim 20, wherein the at least one rank comprises a friend rank indicating a degree of interaction between the user and the at least one interacting subject individual with whom the user has interacted.

23. The system of claim 20, wherein the at least one rank comprises a friend rank generated responsive to at least one interaction between the at least one interacting subject individual with whom the user has interacted and an Internet-based component associated with the advertisement.

24. The system of claim 20, wherein the selected advertisement comprises at least one selected from the group consisting of:
an audio advertisement;
an animated advertisement;
a video;
a text based advertisement;
a text message;
an instant message;
an email message;
a web page;
a banner; and
a portion of a web page.

25. The system of claim 20, wherein the interaction receiving engine is configured to receive the user's interaction with the advertisement, and the system further comprises:
a storage device, configured to store the user's interaction.

26. The system of claim 20, wherein the interaction receiving engine is further configured to detect a mood of the represented subject individual from the visible indicia of the selected advertisement.

* * * * *